No. 677,654. Patented July 2, 1901.
R. D. GALLAGHER, Jr.
DRAFT OR BUFFING RIGGING.
(Application filed Apr. 8, 1901.)
(No Model.) 6 Sheets—Sheet 1.

Fig. 1.

No. 677,654. Patented July 2, 1901.
R. D. GALLAGHER, Jr.
DRAFT OR BUFFING RIGGING.
(Application filed Apr. 8, 1901.)
(No Model.) 6 Sheets—Sheet 4.

Witnesses
Inventor
Richard D. Gallagher Jr
By Church & Church
his Attorneys

THE NORRIS PETERS CO., PHOTO-LITHO., WASHINGTON, D. C.

No. 677,654.  
R. D. GALLAGHER, Jr.  
DRAFT OR BUFFING RIGGING.  
(Application filed Apr. 8, 1901.)  
Patented July 2, 1901.

(No Model.)  
6 Sheets—Sheet 6.

Inventor  
Richard D. Gallagher, Jr.  
by Church & Church  
his Attorneys

Witnesses

UNITED STATES PATENT OFFICE.

RICHARD D. GALLAGHER, JR., OF NEW YORK, N. Y., ASSIGNOR TO STANDARD COUPLER COMPANY, OF SAME PLACE.

DRAFT OR BUFFING RIGGING.

SPECIFICATION forming part of Letters Patent No. 677,654, dated July 2, 1901.

Application filed April 8, 1901. Serial No. 54,900. (No model.)

*To all whom it may concern:*

Be it known that I, RICHARD D. GALLAGHER, Jr., a citizen of the United States, residing at New York, in the county and State of New York, have invented certain new and useful Improvements in Draft or Buffing Rigging; and I do hereby declare the following to be a full, clear, and exact description of the same, reference being had to the accompanying drawings, forming a part of this specification, and to the figures of reference marked thereon.

This invention relates to improvements in rigging designed to yield and take up strains of parts moved by heavy pressure, and while the invention is well adapted for use in connection with heavy mechanism or mechanism operating under heavy pressure, such as ordnance, wherein the recoil must be checked, it is particularly designed to answer the requirements of the draft-rigging for cars, and more especially rigging of heavy rolling-stock—as, for instance, the modern steel cars of large capacity.

In its application to draft-rigging for cars the invention is designed to be capable of ready application to cars of practically any type and having either steel or wood draft-timbers or framing.

To this end one of the objects of the invention is to provide a structure capable of being readily substituted for draft-rigging on rolling-stock now in use or applied to rolling-stock in course of construction without cutting to any material extent the draft-timbers when of wood or modifying the framing when of metal.

A further object of the invention is to provide a structure in which the springs may be arranged in the line of pressure and at the same time their resistance so augmented and modified that springs of ordinary standard size and power may, where desired, be utilized for the draft-rigging of rolling-stock of practically unlimited weight and without occasioning shock or oscillation of the cars in starting, stopping, or varying speed and regardless of the length of the train.

The invention consists, primarily, in a checking mechanism embodying a yielding resistance member acting in the line of strain with a speed-varying mechanism interposed between the moving and yielding resistance members, whereby they are caused to act one upon the other to effect differential movement and consequent augmentation or diminution of the resistance to the movement.

The invention further consists in a checking mechanism having the characteristics last mentioned and embodying a frictional speed-varying mechanism, whereby friction is caused to act in conjunction with the movements to both augment the power of the yielding resistance and to overcome the recoil effects of the same.

The invention further consists in a checking mechanism having the moving member and spring-resistance members arranged in alinement with interposed friction members, each having faces inclined in opposite directions, whereby the transverse displacement due to one incline is converted into lineal pressure by the other incline.

The invention further consists in certain novel details of construction and combinations and arrangements of parts, all as will be now described, and pointed out particularly in the appended claims.

In the accompanying drawings.

Like numerals in the several figures designate the same parts.

In the application of the invention to a draft-rigging of railway-cars the working parts of the mechanism are preferably sustained between cheek-plates, which may be of suitable design to adapt them for attachment to the sills or draft-timbers of the car-frame, and in the preferred type these cheek-plates are made as nearly as possible to conform to the requirements of car-frames of any construction now in use or so as to be capable of application thereto without modification, but simply by varying the mode of attachment.

Figure 1:
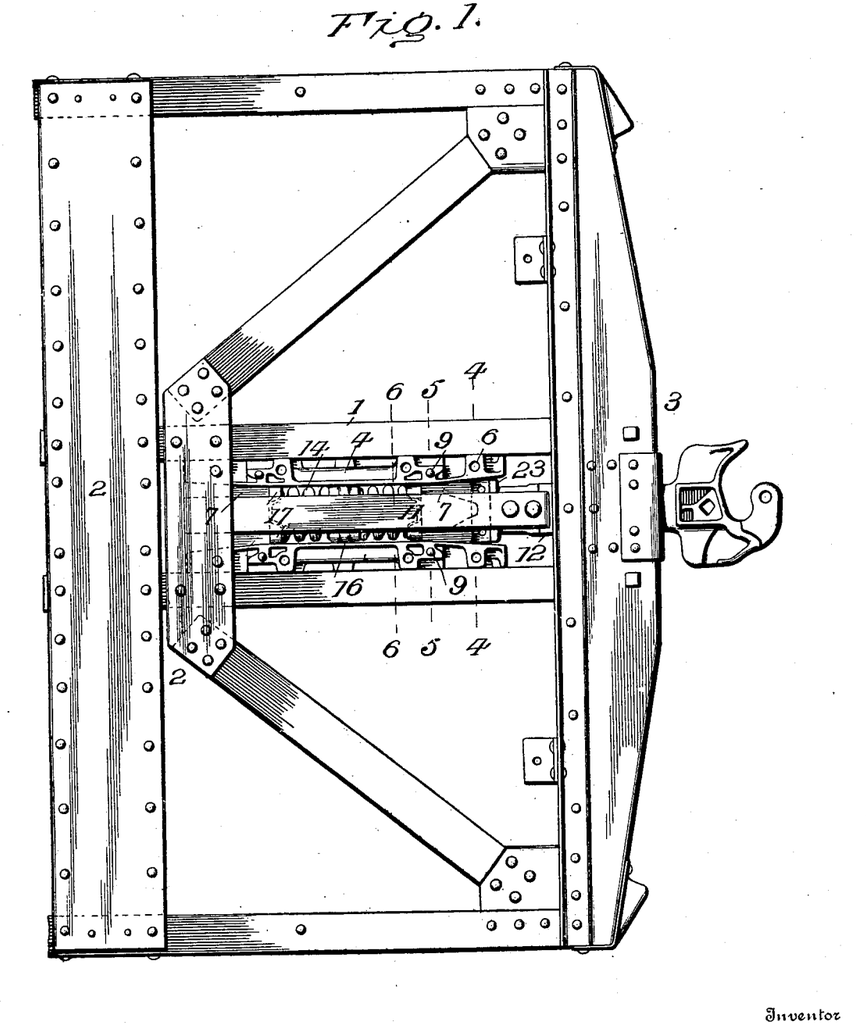
Figure 1 is a top plan view of the underframe of one end of a steel car having a draft-rigging embodying the present improvements applied thereto.

Referring to Fig. 1 of the drawings, the numeral 1 indicates the sills of a steel car-frame 2. Said car-frame at the forward end has the usual buffer-beam 3 and may be suitably braced in any ordinary or preferred manner. The cheek-plates before referred to are indicated by the numeral 4 and are secured to the sills 1 by bolts or rivets, Fig. 6, passing through suitable holes in the cheek-plates and sills, respectively, and sufficient in number to withstand the strains of draft or thrust incidental to the handling of rolling-stock. By reference to Figs. 7 and 8, which represent one-half of a cheek-plate in elevation and top plan, it will be seen that transverse rivet or bolt holes 5 are formed therein at a number of different points for the passage of the attaching rivets or bolts where the cheek-plates are applied, as illustrated in Figs. 1, 4, 5, and 6, and to adapt the cheek-plates for attachment to the under sides of draft irons or plates or other car-framing said cheek-plates are preferably formed with vertical apertures 6, through which vertical bolts may be passed when so desired, all of said holes being so located as to lighten the cheek-plates so far as possible and at the same time prevent undue weakening of said plates by reducing the metal therein beyond the limit of safety. These cheek-plates may be simple castings suitably recessed and ribbed for lightness and strength, and in the preferred construction they are provided with vertically-extending pockets or recesses (best shown in Figs. 2 and 5) and adapted for the reception of frames 7, having inwardly-projecting inclined faces 8 on opposite sides, as shown clearly in Fig. 10. The cheek-plates and frames 7 constitute a rigid structure in the preferred form of apparatus, said frames 7 being held in position by vertically-extending bolts 9, Fig. 5, passing up through the frames and through overhanging portions of the cheek-plates, whereby said frames 7 and parts attached or supported thereby, as will be presently described, may be readily placed in position or removed from below without disturbing the cheek-plates in their position on the sills or draft-timbers of the car. The recesses for the frames 7 are preferably undercut for the reception of projections 10 on said frames, whereby the parts are locked together and transverse separation or displacement prevented.

The strap 11, to which the rear end of the draw-bar 12 is connected, passes above and below the frames 7 and longitudinally between the cheek-plates 4. Thus said frames 7 would normally support the strap and rear end of the draw-bar; but to afford additional support for said strap, as well as to guide the same so as to prevent its transverse displacement, keepers 13 are preferably arranged beneath one or both of the frames 7 and held in place by the bolts 9.

The working parts of the rigging all lie between the cheek-plates and within the strap 11, the yielding member being preferably formed by a coiled spring or springs, which may be of the standard types now commonly used in draft-rigging. Tandem springs are preferably employed in order to secure a somewhat wider range of movement, such springs being indicated by the numeral 14. At their outer ends the springs 14 abut against longitudinally-movable followers 15, and at their inner ends they are supported and held in position by a connecting-piece 16, said followers 15 and connecting-piece 16 being provided with suitable means for retaining the springs in position—such, for instance, as the flanges 17 and central hubs 18 and 19, the latter also serving as a means for limiting the compression of the spring, whereby it is saved from undue strain when subjected to excessive pressure and also to transmit the pressure should a spring be broken. The coupling 16 may be limited in its motion by inwardly-extending projections or flanges 20 on the cheek-plates, as shown clearly in Figs. 2 and 6, whereby should one of the springs break or be removed the coupling coming to rest against the stop 20 would keep the other spring in operative relation. These stops also throw the strains at final compression on the central portions of the cheek-plates rather than on the ends or weaker portions of the plates.

Figures 6, 7, 8:
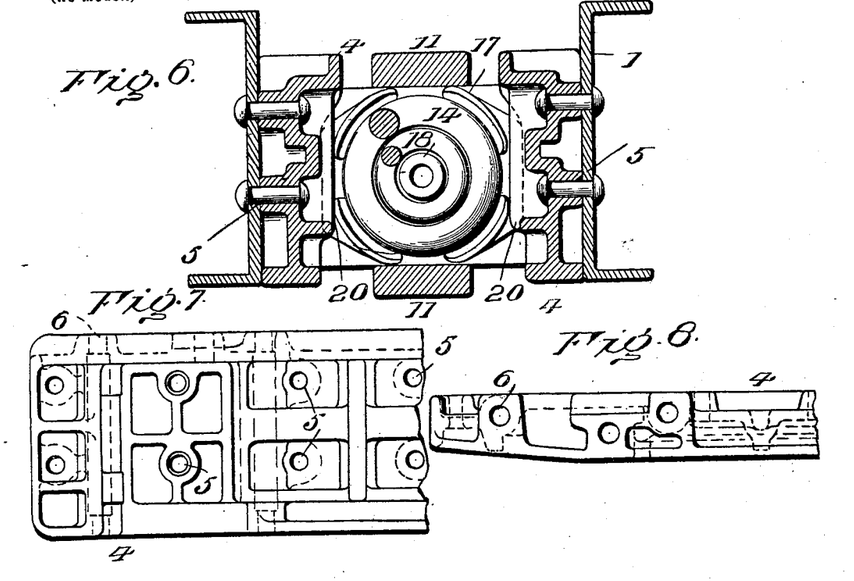
Fig. 6 is a vertical section on the line 6 6, Fig. 1.
Figs. 7 and 8 are an elevation and plan, respectively, of one-half of one of the cheek-plates.

The followers 15, it will be understood, are movable longitudinally, one under the influence of draft strains and the other under the influence of buffing or check strains, and these movements, while taking place simultaneously with the movements of the draw-bar, are not coextensive with such draw-bar movements; but the draw-bar movements and follower movements are differential movements or effect a compression of the spring not coextensive with the draw-bar movement, and in the preferred type of draft-rigging the range of spring compression is considerably greater than the movement of the draw-bar. Thus for a given draw-bar movement we have a relatively greater spring compression and corresponding increase in spring-power. To give this differential effect, the followers 15 are provided with inclines 21, said inclines being in an opposite direction to the inclines 8 of the frames 7 and occupying the same transverse plane. In fact, the followers 15 project into the frames 7, and said frames constitute the stops for limiting the outward movement of the followers and spring. Between the inclines 8 and 21 wedge-blocks 22 are interposed, said wedge-blocks fitting the space between said inclined faces and being capable of both a longitudinal and transverse movement. These movements take place simultaneously in the operation of the mechanism whenever pressure is applied thereto in one or the other direction. For coöperating with the wedge-blocks the strap is provided with working heads 23, preferably having flat faces for contacting with the outer faces of wedge-blocks 22 and with recesses 24 and a central rib 25 for coöperating with the recessed noses 26 of the followers 15. With such construction movement of the draw-bar with its strap and working heads in either direction will exert a pressure on the wedge-blocks 22, thereby causing said wedge-blocks to travel forwardly and toward each other down the inclines 8, and the wedge-blocks in turn, acting on the inclined faces 21 of the followers 15, will cause said heads to move inwardly in a lineal line or in the line of pressure, but at a greater speed than the speed of the draw-bar and its attached parts. The effect is therefore with this arrangement to give a long movement to the follower during a relatively short movement of the draw-bar, the difference in such movements being determined by the angle of the inclines before referred to, and hence by varying such angles the differential movement may be correspondingly varied, and incidentally thereto the frictional resistance of the inclines correspondingly varies. In such variations, however, care must be taken that the angle of rest be not too closely approached in order to prevent any liability of the parts sticking and failing to operate when needed.

Practical demonstration with an apparatus such as thus far described has shown that the effective resistance of the spring is increased very largely, and in addition the frictional resistance of the working faces of the inclines and of the face of the working heads and wedge-blocks prevents any sudden movement tending to compress the spring and also effectually checks the recoil of the spring. From this it will be seen that by the simple interposition of the inclines and wedge-blocks, having oppositely-inclined faces, the effective action of standard springs may be vastly increased—in fact, increased to almost an unlimited degree—and the transverse space required is no greater than that required in an ordinary draft-rigging wherein the springs act directly.

The working heads 23 preferably abut against stops 27 on the cheek-plates in their outward movements, thereby holding the wedge-blocks and other parts in their normal position when the strap moves away from the working heads, which occurs when pressure is applied at the opposite end, and their inward movement is arrested by their flanges at top and bottom striking the top and bottom of the frames 7. The edges of the working heads normally project just within the top and bottom portions of the frames 7 to prevent the vertical displacement of the working heads even when the strap is not in position, as well as to relieve strain on the strap. The construction of the heads with the tongues 25 strengthens the structure to a very material degree and at the same time permits of the use of long inclines on the follower 15.

Figure 2:
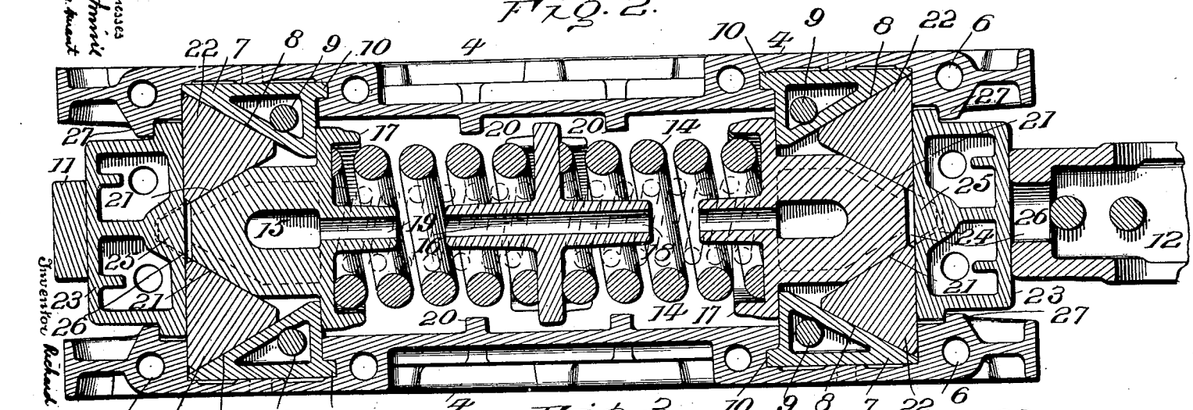
Fig. 2 is a horizontal section through the rigging alone.
Figure 3:
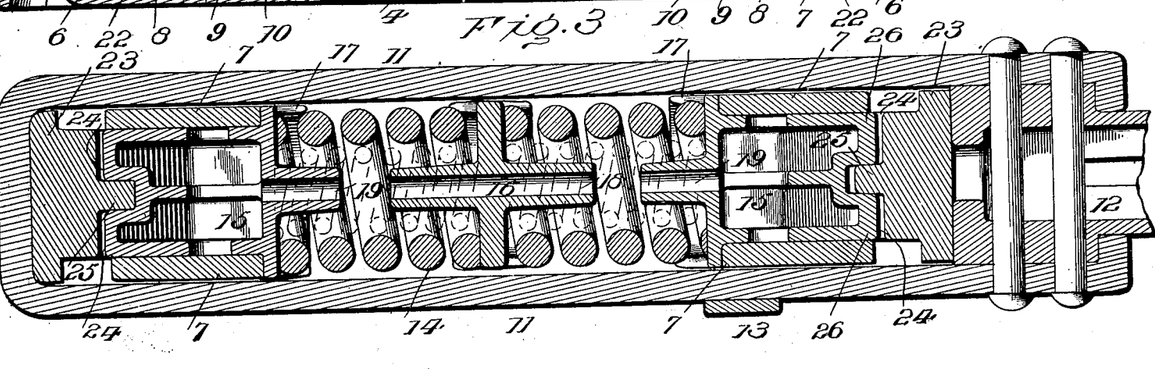
Fig. 3 is a vertical section through the same, taken longitudinally.
Figure 4:
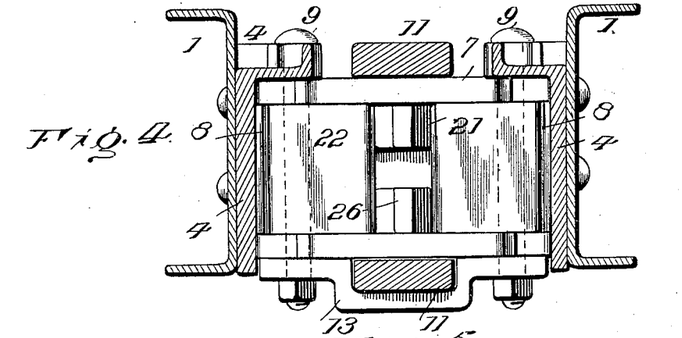
Figs. 4 and 5 are vertical sections on the lines 4 4 and 5 5, Fig. 1.

Many variations may be made in the arrangements of the wedge-blocks and inclined faces for securing a differential spring compression in a lineal direction—thus, for instance, by a reverse arrangement to that illustrated in Fig. 2 and heretofore described, would give a relatively long draw-bar movement and a short spring movement, or by employing but one set of wedges a differential movement in one direction may be secured and the direct action of the springs in the opposite direction utilized, or by a tandem arrangement the ratio of movement and resistance still further increased, or by forming an incline to move with the strap a reverse movement be given the follower.

Several convenient and practical modifications of the invention are illustrated in Figs. 13 to 21, inclusive, some or all of which are well adapted for draft-rigging of cars or checks for arresting the movements of the heavy parts in any situation.

Figure 13:
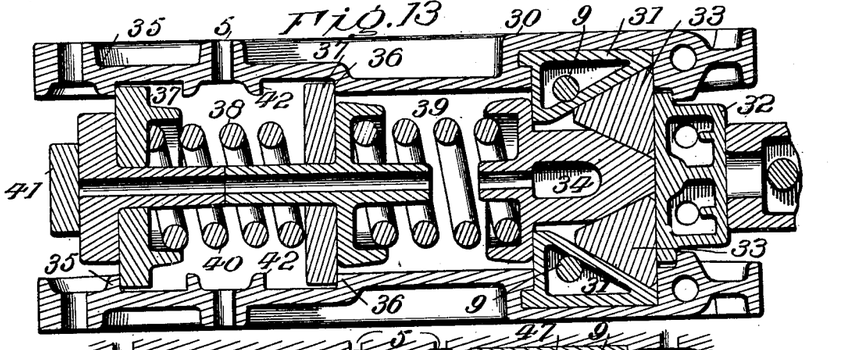
Figs. 13, 14, 15, 16, 17, 18, and 22 are sectional views illustrating variations in the form and manner of assembling the members, these views being diagrammatic in order that the application of the invention in the various forms and to uses other than the draft-rigging of cars may be more clearly comprehended.

Referring to Fig. 13, the cheek-plates (numbered 30) support at one end only a frame 31, corresponding to the frame 7, and at this end also are located a working head 32, wedge-blocks 33, and a follower 34, corresponding to the similar parts heretofore described; but at the opposite end the cheek-plates 30 are provided with stops 35 and 36 for retaining ordinary follower-plates 37, between which the spring 38 is located. In front of the forward follower-plate 37 a second spring 39 is located and bears against the rear end of the follower 34. The springs are retained in position by flanges and hubs 40, the hubs 40 between the rear follower-plates preferably being in contact, and thus the strap 41, which passes around the follower-plates and working head, will when subjected to draft strains compress both the springs 38 and 39. On the reverse movement or when subjected to buffing strains acting through the wedge-blocks and working head 32 said strains will initially compress the spring 39, and as it is compressed, the pressure being transmitted to the forward follower-plate 37, the rear spring 38 will also be compressed, the parts finally coming to rest under excessive strain in the latter direction, when the hubs 40, between the head 34 and forward follower-plate, come in contact, and the forward follower-plate abuts against the stops 42 provided for the purpose, or the flanges on the working head strike the frame 31, as before described.

Figure 14:
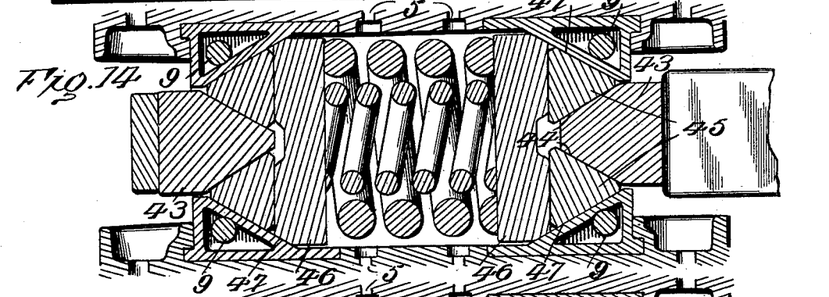

In Fig. 14 the arrangement is such that a relatively long movement of the draw-bar is permitted with a relatively short movement of the yielding element or spring. This is secured by reversing the arrangement shown in Figs. 2 and 13—that is to say, the working heads 43 are provided with inclined faces 44, similar to follower 15, Fig. 2, to coöperate with the wedge-blocks 45, and the wedge-blocks 45 bear against follower-plates 46, preferably having substantially flat faces, and against reversely-arranged inclines 47, which preferably constitute the inner faces of frames corresponding to the frames 7 of Fig. 10. The inward movement of either of the heads 43 moves the wedge-blocks 45 forwardly and outwardly instead of forwardly and inwardly, as heretofore, and the result is that it requires a long movement of the working heads 43 in order to move the follower-plates 46 a relatively very much shorter distance. This arrangement is well adapted for use in connection with exceedingly heavy springs and where the limit of elasticity may be quickly reached, or where it is desired to exert the greatest frictional resistance to obviate spring recoil.

Figure 15:
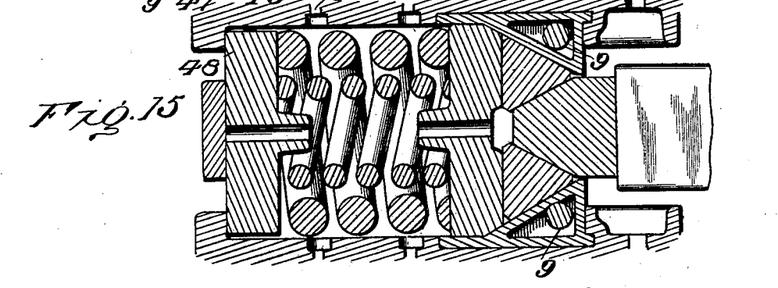

Fig. 15 corresponds to Fig. 14, save that in this instance a follower-plate 48 is employed at one end of the spring for direct coöperation with the spring, or, in other words, the means for effecting the differential movement are omitted from this end of the device, whereby the arrangement is adapted for use in draft-rigging where the direct spring action is desired for draft and the differential action for buffing strains.

Figure 16:
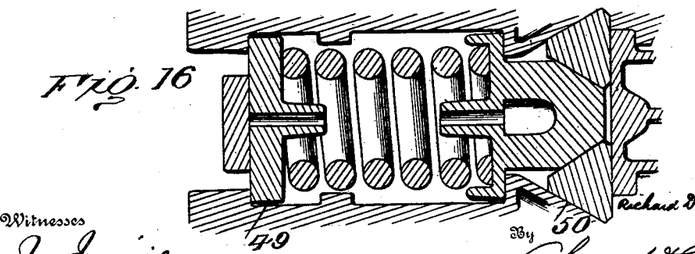

Fig. 16 is an embodiment corresponding to Fig. 13, but omitting the tandem arrangement of springs and illustrating the use of one of the followers having the inclines as an abutment where the spring is confined between said follower and a simple follower-plate 49. This figure also illustrates the fact that the inclines 50, corresponding to the inclines 8 of the frame 7, Fig. 10, may be made integral with the cheek-plates or other inclosing housing for the working parts.

Figure 17:
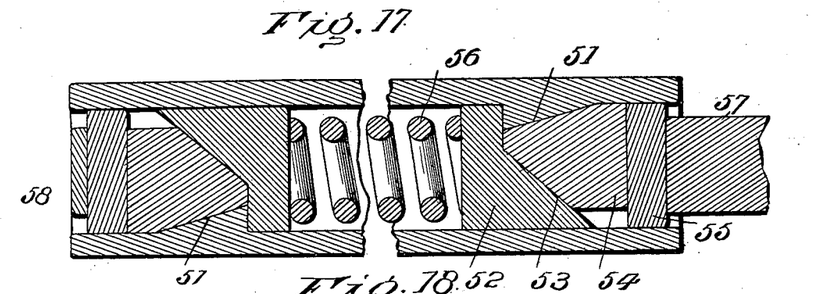

Fig. 17 is a diagrammatic section illustrating the employment of a single wedge-block at each end of the spring instead of a pair of wedge-blocks, as in the prior illustrations. In this figure the housing or cheek-plate at each end is provided with but one incline 51 and the follower 52, corresponding to the follower 15, with a single incline 53. The wedge-block 54 coöperates with these two inclines, and inasmuch as the follower 52 cannot move transversely as the wedge-block 54 advances and is moved transversely against the incline 53 by its contact with the incline 51 the follower 52 will be given a greater range of movement than the working head 55. The spring 56 is preferably interposed directly between the two followers 52, while the draw-bar 57 and strap 58 are employed as the strain-transmitting media.

Figures 5, 9, 10, 11, 12:
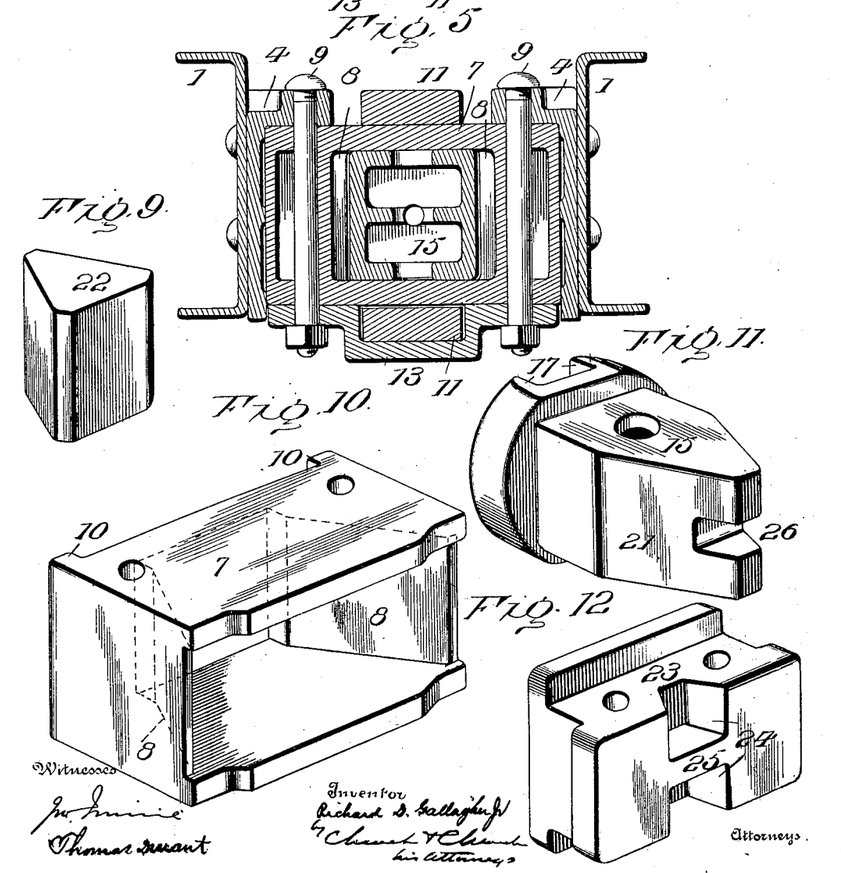
Figs. 9, 10, 11, and 12 are perspective views of the devices for effecting differential movements of the members and imparting the desired frictional resistance.
Figure 18:
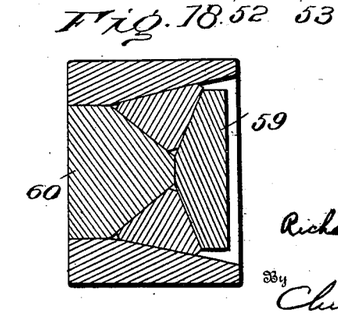

Fig. 18 illustrates diagrammatically a construction wherein the two heads or followers 59 and 60, corresponding to the heads 15 and 23, Figs. 11 and 12, are both provided with inclined faces, thereby securing a somewhat greater differential movement when one or the other of said heads is advanced and also creating more friction than in the other arrangements described.

Figure 19:
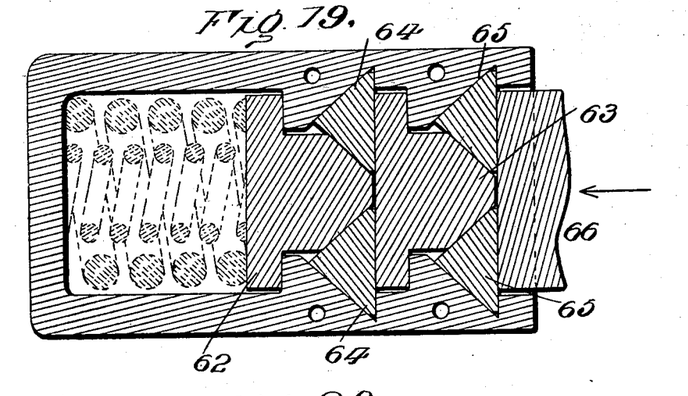
Fig. 19 is a similar view showing a "tandem" arrangement.

In Fig. 19 the arrangement of wedge-blocks is similar to the arrangement in Fig. 2, only duplicate parts are arranged in tandem. In this arrangement two followers 62 and 63 are employed, coöperating with separate sets of wedge-blocks 64 and 65. The follower 63 operates as a working head in its coöperation with the wedge-blocks 64, while the working head 66 coöperates with the wedge-block 65. With this construction not only is the resistance greatly increased, but the range of spring compression is increased correspondingly and a much lighter spring may be employed.

Figure 20:
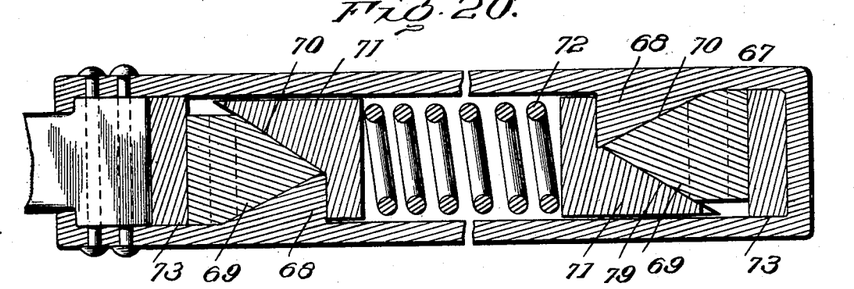
Fig. 20 is a sectional view of a draft-rigging, illustrating an arrangement of the inclines for giving reverse lineal movement.
Figure 21:
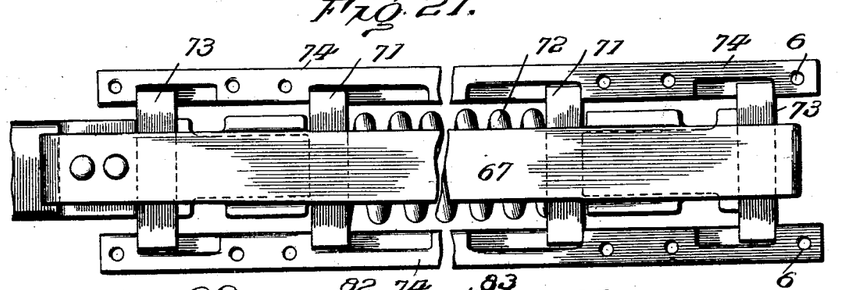
Fig. 21 is a top plan of the arrangement shown in Fig. 20.

In Figs. 20 and 21 the arrangement is such that a reverse movement of the follower occurs, and when desired the spring may thus be compressed by a follower movement at both ends. For this purpose the strap or frame 67, corresponding to the strap, is provided with an incline 68, or, when double-acting, with two opposite inclines 68, one at each end. A wedge-block or wedge-blocks 69 coöperate with the inclines 68 and also with inclines 70 on followers 71, between which the spring 72 is confined. The wedge-blocks 69 abut in their outward movement against cross or follower plates 73, and the cross-plates 73, as well as the follower 71, may be held between cheek-plates 74 or work in recesses therein, whereby their lineal movements are limited, as will be readily understood from an inspection of Fig. 21.

Figure 22:
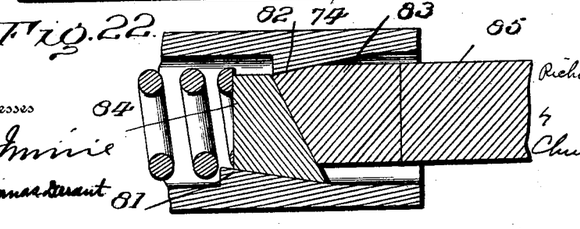

Movement of the strap or frame 67 in one direction or the other will cause the incline 68 at the forwardly-moving end to displace the wedge-block 69 transversely by sliding it on the cross-plate 73, and the transverse movement of the wedge-block acting on the incline 70 moves the follower 71 backwardly against the tension of the spring. At the opposite end of the frame 67 the cross-plate 73 and follower 71 are moved in unison with the frame, and thus the spring is compressed by the opposite movements of the followers. While the resistance member is moved lineally or in a direction to compress the spring lineally, it is practicable to arrange the inclines in such manner that the resistance member in addition to its lineal movement will be simultaneously displaced transversely, and, furthermore, it is obvious that if the working head or draw-bar be permitted a transverse movement either of these parts may be rigidly connected with or integral with the wedge-block. As an example of this arrangement, reference may be had to Fig. 22, in which the frame or cheek plates have inclines 81 and 82 on opposite sides, the wedge-block 83 is rigid with the rear end of the draw-bar 85, and the follower 84, in addition to moving lineally, has a transverse movement due to the action of the incline 81. The draw-bar follows the transverse movement of the wedge-block, and the latter being displaced transversely by the incline 82 imparts differential movement to the follower, the lineal movement of the latter being modified and the frictional resistance increased by the action of the incline 81.

Obviously in all of the arrangements shown, except in Figs. 19 and 20, the strap or the rear end of the draw-bar may act as the working heads and the latter omitted; but they are preferably employed, as they present capacity for renewal when broken or worn without renewing the strap or draw-bar.

From the foregoing it will be observed that the mechanism in its several forms embodies a spring-supported resistance member—as, for instance, the end of the spring or the follower—a pressure-transmitting member—as, for instance, the draw-bar of the draft-rigging or the parts moving therewith—and a guiding-support—as, for instance, the inclines 8, Fig. 10, or the follower-plates 73, Figs. 19 and 20. By the proper angular disposition of the friction-faces the movement of one member as imparted to the other is a differential movement, the transformation into a faster or slower movement taking place through the wedge-block which is displaced transversely. The inclines and wedge-block therefore constitute a differential driving mechanism, and this particular differential driving mechanism is preferred because of advantages due to the frictional resistance to the movements of the several working parts, as heretofore explained.

Having thus described my invention, what I claim as new, and desire to secure by Letters Patent, is—

1. In a mechanism such as described, the combination of the following instrumentalities, to wit; a yielding resistance member and a pressure-transmitting member arranged in alinement and both simultaneously movable lineally, a wedge-block having oppositely-inclined faces interposed between said members and movable transversely, and a guiding-support independent of said members with which the wedge-block coöperates in its transverse movement, as and for the purpose specified.

2. In a mechanism such as described, the combination of the following instrumentalities, to wit, a yielding resistance member, a pressure-transmitting member arranged in alinement therewith and both simultaneously movable lineally, a guiding-support, said members and guiding-support each having a friction-face arranged at a different angle from the friction-faces on the other members, and a wedge-block having friction-faces coöperating with the friction-faces on the two members and guiding-support respectively, for the purpose specified.

3. In a mechanism such as described, the combination with a yielding resistance member, a pressure-transmitting member, both movable lineally, and a guiding-support, each having a friction-face angularly disposed with relation to the other and forming an angular chamber between them, of a block mounted loosely in said chamber whereby the lineal movement of one member is transmitted to the other by the angular displacement of the block, substantially as described.

4. In a mechanism such as described, the combination with a yielding resistance member, a pressure-transmitting member, and a guiding-support each having a friction-face angularly disposed with relation to the other and forming an angular chamber between them, of an angular wedge-block mounted in said chamber and having correspondingly angularly disposed friction-faces coöperating with the faces of the other members, whereby the lineal movement of one member is transmitted to the other by the angular displacement of the wedge-block as and for the purpose set forth.

5. In a mechanism such as described, the combination with a spring-supported resistance member, a pressure-transmitting member both movable lineally and having friction-faces angularly disposed with relation to each other and a guiding-support having a friction-face disposed in a plane at an angle to the line of lineal movement of the other members, of a block interposed between said friction-faces and operating to transmit the lineal movement of one member to the other by being displaced in the plane of the guiding-support by contact with said friction-faces; as and for the purpose set forth.

6. In a mechanism such as described, the combination with a spring-supported resistance member, a pressure-transmitting member both movable lineally and having friction-faces angularly disposed with relation to each other and a fixed guiding-support having a friction-face angularly disposed with relation to the other faces whereby an angular chamber is formed between said faces, of a wedge-block located in said chamber and having friction-faces corresponding in angular disposition to and coöperating with the friction-faces on the members and support respectively to transmit the lineal movement of one member to the other; substantially as described.

7. In a mechanism such as described, the combination of the following instrumentalities, to wit; a spring-supported resistance member, a pressure-transmitting member arranged in alinement therewith and both simultaneously movable lineally and a differential driving mechanism interposed between said members whereby a differential lineal movement is imparted by one member to the other, for the purpose set forth.

8. In a mechanism such as described, the combination of the following instrumentalities, to wit; a spring-supported resistance member, a pressure-transmitting member arranged in alinement therewith and both simultaneously movable lineally and a differential driving mechanism interposed between the members and embodying transversely-movable wedge-blocks and coöperating inclines, for the purpose set forth.

9. In a mechanism such as described, the combination of the following instrumentalities, to wit; a spring-supported resistance member, a pressure-transmitting member, both movable lineally, a fixed guiding-support having an inclined face and wedge-blocks interposed between said members and movable on the inclined face of the guiding-support; substantially as described.

10. In a mechanism such as described, the combination with a guiding-support having an inclined inner face, a yieldingly-supported resistance member having a face disposed at an angle to the face on the support and a pressure-transmitting member having a face disposed at an angle to the before-mentioned faces whereby an angular chamber is formed, said members being movable lineally with relation to the guiding-support, of a wedge-block interposed in the chamber between said faces; substantially as described.

11. In a mechanism such as described, the combination with a guiding-support having oppositely-disposed inclined faces, a yieldingly-supported resistance member having faces disposed at angles to the faces on the support and a pressure-transmitting member having faces disposed at angles to the before-mentioned faces whereby two angular chambers are formed, of independent wedge-blocks interposed in the chambers between said faces; substantially as described.

12. In a mechanism such as described, the combination with the guiding-support having oppositely-inclined faces, the yieldingly-supported resistance member having oppositely-inclined faces and wedge-blocks interposed between the inclined faces of the resistance member and inclined faces of the guiding-support, of a pressure-transmitting member having faces coöperating with said wedge-blocks; substantially as described.

13. In a mechanism for the purpose specified, the combination with a yieldingly-supported resistance member, having inclined faces, a supporting guide member having faces inclined oppositely to the faces on the resistance member and triangular wedge-blocks interposed between said faces, of a pressure-transmitting member coöperating with said wedge-blocks; substantially as described.

14. In a mechanism for the purpose specified, the combination with a yieldingly-supported resistance member having inclined exterior faces, a fixed supporting guide member having inclined interior faces and loose wedge-blocks interposed between said faces, of a pressure-transmitting member coöperating with said blocks; substantially as described.

15. In a mechanism such as described, the combination with a yielding pressure-resisting member, a pressure-transmitting member and interposed wedge-blocks for transmitting the movement of one member to the other, of a frame surrounding said wedge-blocks and having internal inclined faces constituting supporting-guides with which the wedge-blocks coöperate; substantially as described.

16. In a mechanism such as described, the combination with a yielding pressure-resisting member, having external inclined faces, a frame surrounding said member to constitute a guide therefor and having internal inclined faces and loose wedge-blocks interposed between said faces, of a pressure-transmitting member coöperating with said wedge-blocks; substantially as described.

17. In a mechanism such as described, the combination with oppositely-disposed pressure-resisting members and a spring interposed between said members to separate them, of a pressure-transmitting member arranged lineally with respect to said resisting members and loose transversely-movable wedge-blocks interposed between said pressure resisting and transmitting members with guides for said blocks whereby a differential movement is imparted from one to the other in either direction; substantially as described.

18. In a mechanism such as described, the combination with pressure-resisting members having external inclined faces and a spring interposed between said members for separating them, of a pressure-transmitting member, loose wedge-blocks interposed between each of said resisting members and the transmitting member and fixed supporting-guides having inclined faces with which the wedge-blocks coöperate; substantially as described.

19. In a draft-rigging, the combination with the cheek-plates, the removable frames mounted therein and having the internal inclined faces, the followers mounted in said frames and having the external inclined faces, the draw-bar and strap and the working heads, of the loose wedge-blocks interposed between said inclined faces and the working heads and a spring interposed between the followers; substantially as described.

20. In a draft-rigging, the combination with the cheek-plates, the removable frames mounted therein and having internal inclined faces, bolts uniting said frames and cheek-plates, the followers having external inclined faces and the spring interposed between said followers, of the working heads, shoulders on the cheek-plates for limiting the outward movement of the heads and flanges coöperating with the frames for limiting their inward movement and wedge-blocks interposed between the inclined faces and working heads; substantially as described.

21. In a draft-rigging, the combination with the cheek-plates, a frame mounted in vertical seats in said plates and having internal inclined faces, a spring-pressed follower having external inclined faces and working in said frame and a working head with stops for limiting its lineal movement, of loose wedge-blocks interposed between the frame-follower and head; substantially as described.

22. In a draft-rigging a frame having a central opening and internal inclined faces combined with a follower having a wedge-shaped projection, loose wedge-blocks interposed between the inclined faces of the frame and follower and a working head coöperating with said wedge-block; substantially as described.

23. In a draft-rigging, the combination with the resistance-springs arranged in tandem and followers between which the springs are confined, of a coupling interposed between the springs and having a lineal movement, and centrally-arranged coöperating hubs on the coupling and followers of such length as to contact when the springs are compressed for limiting the movement of the followers and coupling toward each other; substantially as described.

24. In a draft-rigging the combination with the resistance-springs arranged in tandem, followers between which the springs are confined, a coupling interposed between the springs and having a lineal movement and hubs on the coupling and followers of such length as to contact when the springs are compressed for limiting the movements of the followers and coupling toward each other, of cheek-plates for supporting the parts and fixed stops on the cheek-plates coöperating with the coupling for limiting the movement of the coupling; substantially as described.

RICHARD D. GALLAGHER, JR.

Witnesses:
ALEXANDER S. STEUART,
THOMAS DURANT.